(12) United States Patent
Hallman (10) Patent No.: US 10,392,045 B2
(45) Date of Patent: Aug. 27, 2019

(54) SYSTEMS AND METHODS OF DECOUPLING VEHICLE STEERING ASSEMBLIES WITH INDICATION OF VEHICLE DIRECTION

(71) Applicant: TOYOTA MOTOR ENGINEERING & MANUFACTURING NORTH AMERICA, INC., Erlanger, KY (US)

(72) Inventor: Jason J. Hallman, Saline, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 77 days.

(21) Appl. No.: 15/444,930

(22) Filed: Feb. 28, 2017

(65) Prior Publication Data

US 2018/0244297 A1  Aug. 30, 2018

(51) Int. Cl.
*B62D 15/02* (2006.01)
*B62D 1/06* (2006.01)

(52) U.S. Cl.
CPC ........... *B62D 1/06* (2013.01); *B62D 15/0205* (2013.01); *B62D 15/0265* (2013.01)

(58) Field of Classification Search
CPC combination set(s) only.
See application file for complete search history.

(56) References Cited

U.S. PATENT DOCUMENTS

| | | | |
|---|---|---|---|
| 5,835,870 A | 11/1998 | Kagawa | |
| 9,333,983 B2 | 5/2016 | Lathrop et al. | |
| 2002/0067078 A1 | 6/2002 | Hogarth | |
| 2011/0153160 A1 | 6/2011 | Hesseling et al. | |
| 2014/0277896 A1* | 9/2014 | Lathrop | B62D 1/04 701/23 |

FOREIGN PATENT DOCUMENTS

| | | |
|---|---|---|
| CN | 20144489 U | 6/2010 |
| KR | 20060019763 A | 3/2006 |
| WO | 2015135129 A1 | 9/2015 |

* cited by examiner

*Primary Examiner* — Imran K Mustafa
(74) *Attorney, Agent, or Firm* — Dinsmore & Shohl LLP (57) ABSTRACT

A vehicle includes a steering column assembly including a steering column. A steering wheel apparatus is connected to the steering column. The steering wheel apparatus includes a steering wheel hub that is connected to the steering column and a steering wheel rim that is connected to the steering wheel hub. A clutch mechanism selectively decouples the steering wheel rim from the steering wheel hub thereby allowing rotation of the steering wheel hub within the steering wheel rim.

20 Claims, 5 Drawing Sheets

SYSTEMS AND METHODS OF DECOUPLING VEHICLE STEERING ASSEMBLIES WITH INDICATION OF VEHICLE DIRECTION

TECHNICAL FIELD

The present specification generally relates to vehicles and vehicle systems, and more specifically, to vehicles and vehicle systems for decoupling vehicle steering assemblies that provide an indication of vehicle direction.

BACKGROUND

Vehicles may be equipped with steering assemblies that allow an occupant to steer the vehicle. The steering systems allow drivers to direct motion of the vehicles in forward and rearward directions. The steering assemblies also provide the drivers with visual and haptic feedback on the directionality of the vehicles. For example, drivers can often feel through the steering assemblies in which direction wheels of the vehicles are pointed. Also, the angular position of hubs of the steering assemblies can provide feedback as to the angular position of the wheels.

In vehicles with autonomous driving control, vehicles may control steering to some extent. In instances where vehicle controls steering, the visual and haptic feedback provided by the steering assemblies may not be available to the drivers. Accordingly, a need exists for methods and systems for decoupling vehicle steering assemblies during an autonomous steering operation that continue to provide an indication of vehicle direction using the steering assemblies.

SUMMARY

In one embodiment, a vehicle includes a steering column assembly includes a steering column. A steering wheel apparatus is connected to the steering column. The steering wheel apparatus includes a steering wheel hub that is connected to the steering column and a steering wheel rim that is connected to the steering wheel hub. A clutch mechanism selectively decouples the steering wheel rim from the steering wheel hub thereby allowing rotation of the steering wheel hub within the steering wheel rim.

In another embodiment, a steering wheel apparatus for a vehicle includes a steering wheel hub and a steering wheel rim connected to the steering wheel hub. A clutch mechanism selectively decouples the steering wheel rim from the steering wheel hub thereby allowing rotation of the steering wheel hub within the steering wheel rim.

In another embodiment, a method of decoupling a steering wheel rim from a steering wheel hub during an autonomous driving condition is provided. The method includes detecting a target object using one or more sensors that provide input to one or more processors. A location of the target object relative to the vehicle is determined using the input and the one or more processors. The one or more processors determine if an autonomous driving condition is present based on the input. The one or more processors control a clutch mechanism of a steering wheel apparatus to decouple a steering wheel rim from a steering wheel hub thereby allowing rotation of the steering wheel hub within the steering wheel rim if the autonomous driving condition is present.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles and vehicle systems according to the present specification include vehicle steering assemblies that provide a steering wheel rim decoupling operation where steering wheel rims are decoupled from steering wheel hubs under predetermined automated driving operations. The vehicle steering assemblies include a steering wheel apparatus that is coupled to a steering column. The steering wheel apparatus includes a steering wheel rim that is connected to a steering wheel hub. The steering wheel hub is coupled to the steering column for controlling a driving direction of the vehicle. The vehicle may include an autonomous object detection system that can be used to detect an object and control a driving direction of the vehicle in response to detecting the object. As the driving direction of the vehicle is changed autonomously, the steering wheel rim may disconnect from the steering wheel hub upon the autonomous driving operation. Such a coupling arrangement between the steering wheel rim and the steering wheel hub can allow a driver to maintain hand position on the steering wheel rim as the steering wheel hub rotates during the autonomous driving operation. The steering wheel hub can continue to provide an indication of vehicle direction by virtue of angular position of the steering wheel hub. The steering wheel rim may then reconnect to the steering wheel hub upon completion of the autonomous driving operation.

Figure 1:
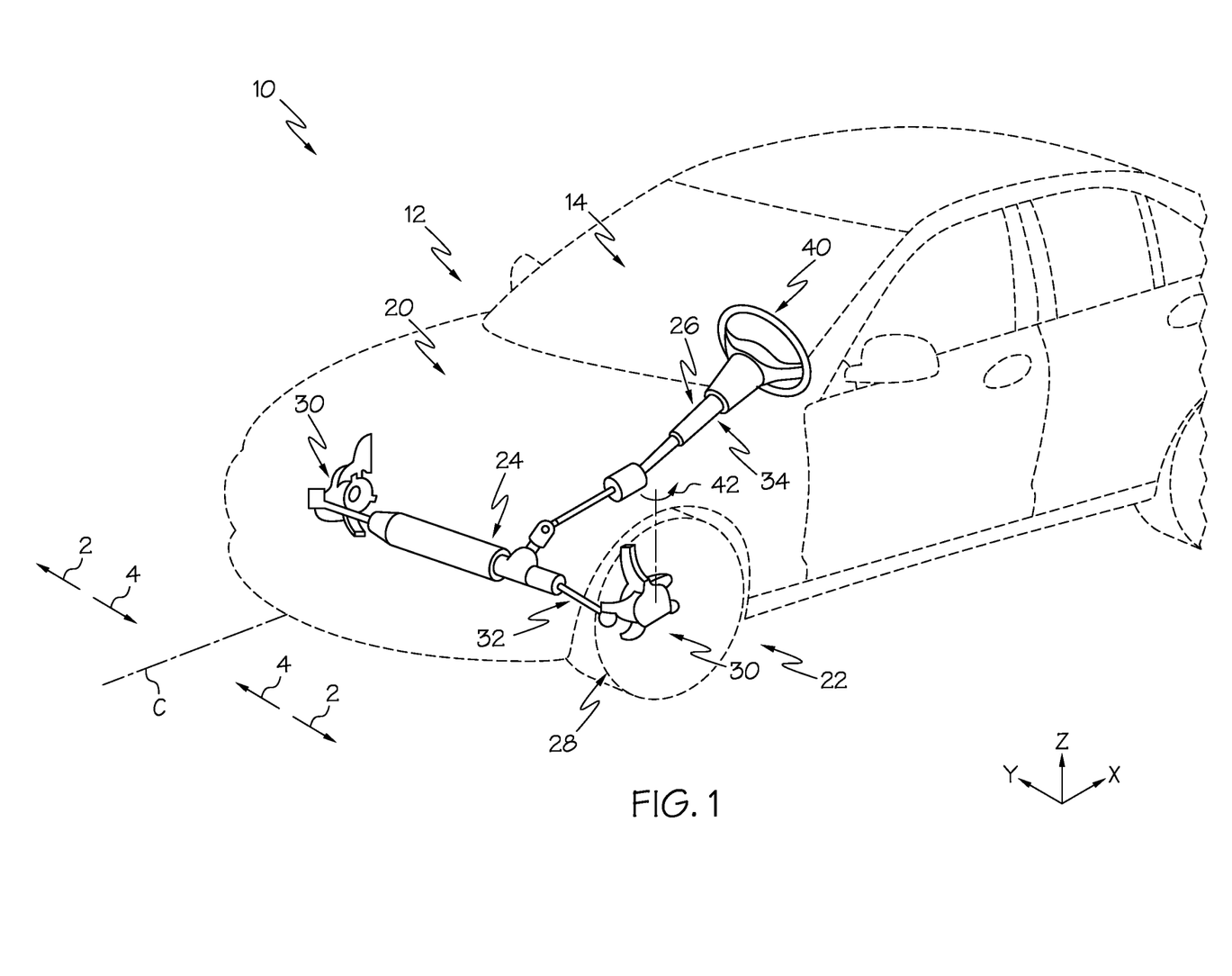
FIG. 1 schematically depicts a perspective view of a vehicle including a steering system according to one or more embodiments shown or described herein.

As used herein, the term "vehicle longitudinal direction" refers to the forward-rearward direction of the vehicle (i.e., in the +/− vehicle X-direction depicted in FIG. 1). The term "vehicle lateral direction" refers to the cross-vehicle direction (i.e., in the +/− vehicle Y-direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). Further, the terms "inboard" and "outboard" are used to describe the relative positioning of various components of the vehicle. Referring to FIG. 1, the term "outboard" as used herein refers to the relative location of a component in direction 2 with respect to a vehicle centerline C. The term "inboard" as used herein refers to the relative location of a component in direction 4 with respect to the vehicle centerline C. Because the vehicle structures may be generally symmetrical about the vehicle centerline C, the direction to which use of terms "inboard" and "outboard" refer may be mirrored about the vehicle centerline C when evaluating components positioned along opposite sides of the vehicle 10.

Referring initially to FIG. 1, a vehicle 10 is depicted. The vehicle 10 includes a body 12 onto which a vehicle drivetrain is coupled. The vehicle 10 also includes a cabin 14 that is integral with the body 12. The cabin 14 generally defines a passenger cabin of the vehicle 10.

The vehicle 10 includes a steering system 20. The steering system 20 generally includes a front wheel 22, a steering rack assembly 24 and a steering column assembly 26. The steering system 20 may include a pair of front suspension units 28 that are coupled to the body 12. The front suspension units 28 may generally include vehicle components that connect the body 12 of the vehicle 10 to the front wheel 22. These components may include a front chassis member that includes a spring and a strut. The spring and the strut may be coupled to a steering knuckle assembly 30 and the front wheel 22 may be coupled to the steering knuckle assembly 30.

The steering knuckle assembly 30 may be coupled to a tie rod 32 that is positioned inboard of the front wheel 22. The tie rod 32 is also coupled to the steering rack assembly 24. Accordingly, the front wheel 22 is coupled to the steering rack assembly 24 through the steering knuckle assembly 30 and the tie rod 32. The steering rack assembly 24 extends in the vehicle lateral direction and is configured to manipulate an orientation of the front wheel 22 with respect to the body 12.

The steering column assembly 26 is coupled to the steering rack assembly 24. The steering column assembly 26 includes a steering wheel column 34 that extends rearward and upward of the steering rack assembly 24 in the vehicle longitudinal direction. The steering column assembly 26 also includes a steering wheel apparatus 40 that is coupled to the steering wheel column 34 and that is positioned within the cabin 14 of the vehicle 10. Accordingly, the steering wheel apparatus 40 is coupled to the front wheel 22, the steering rack assembly 24, the tie rod 32, and the steering knuckle assembly 30. By rotating the steering wheel apparatus 40, an occupant of the vehicle 10 may manipulate the orientation of the front wheel 22 with respect to the body 12 of the vehicle 10. Specifically, when the steering wheel apparatus 40 is rotated, the front wheel 22 may rotate about an axis 42 with respect to the body 12 of the vehicle 10. By rotating the front wheel 22 about the axis 42 with respect to the body 12 of the vehicle 10, the occupant may steer the vehicle 10 during normal vehicle operation.

Figure 2:
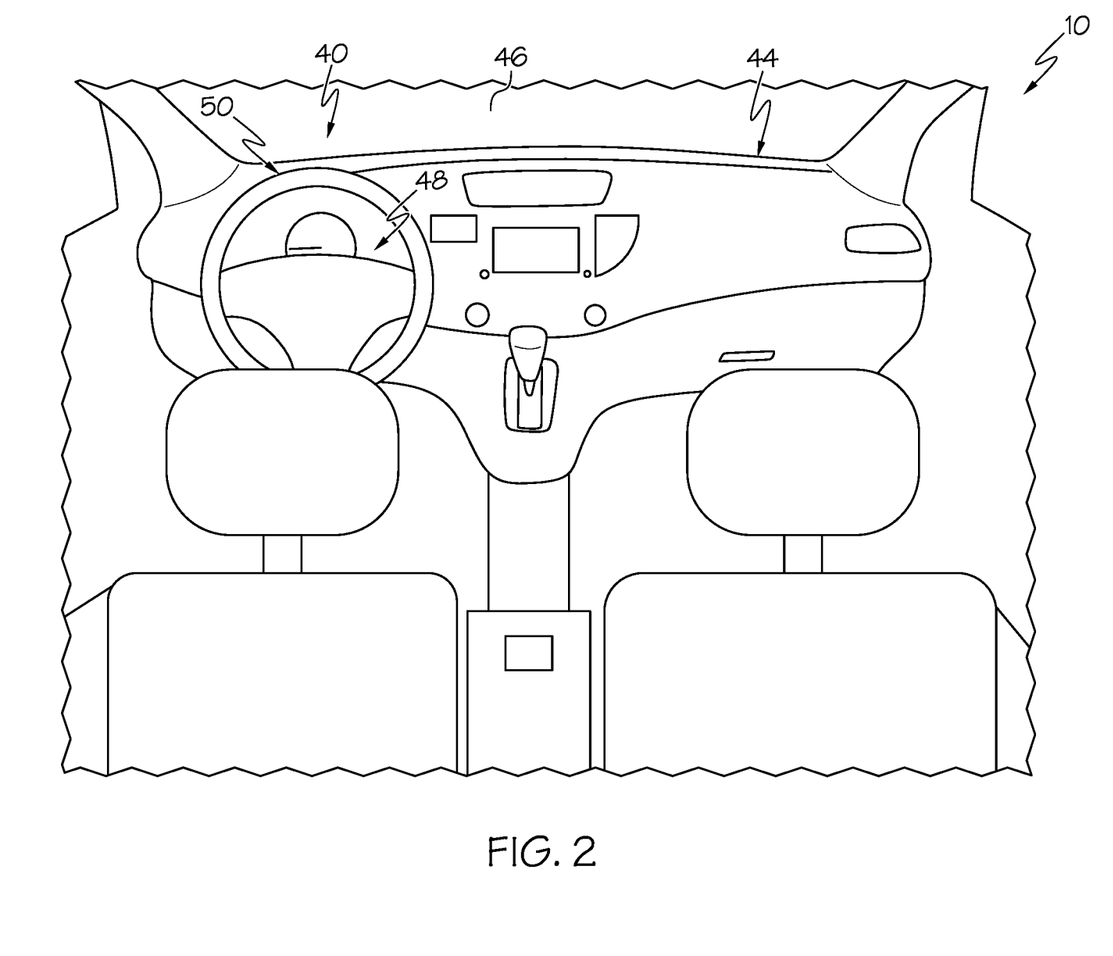
FIG. 2 schematically depicts an interior of the vehicle of FIG. 1 according to one or more embodiments shown and described herein.

Referring to FIG. 2, an interior of the vehicle 10 includes a dashboard 44, a windshield 46 and the steering wheel apparatus 40. The steering wheel apparatus 40 includes a steering wheel hub 48 that is connected to a steering wheel rim 50. As will be described in greater detail below, the steering wheel rim 50 is releasably connected to the steering wheel hub 48 such that the steering wheel hub 48 can rotate relative to the steering wheel rim 50 under predetermined autonomous driving operations. When referring to autonomous or partially autonomous vehicles, it is meant to refer to vehicles having at least one drive mode wherein a human operator is not necessary to guide the vehicle.

Figure 3:
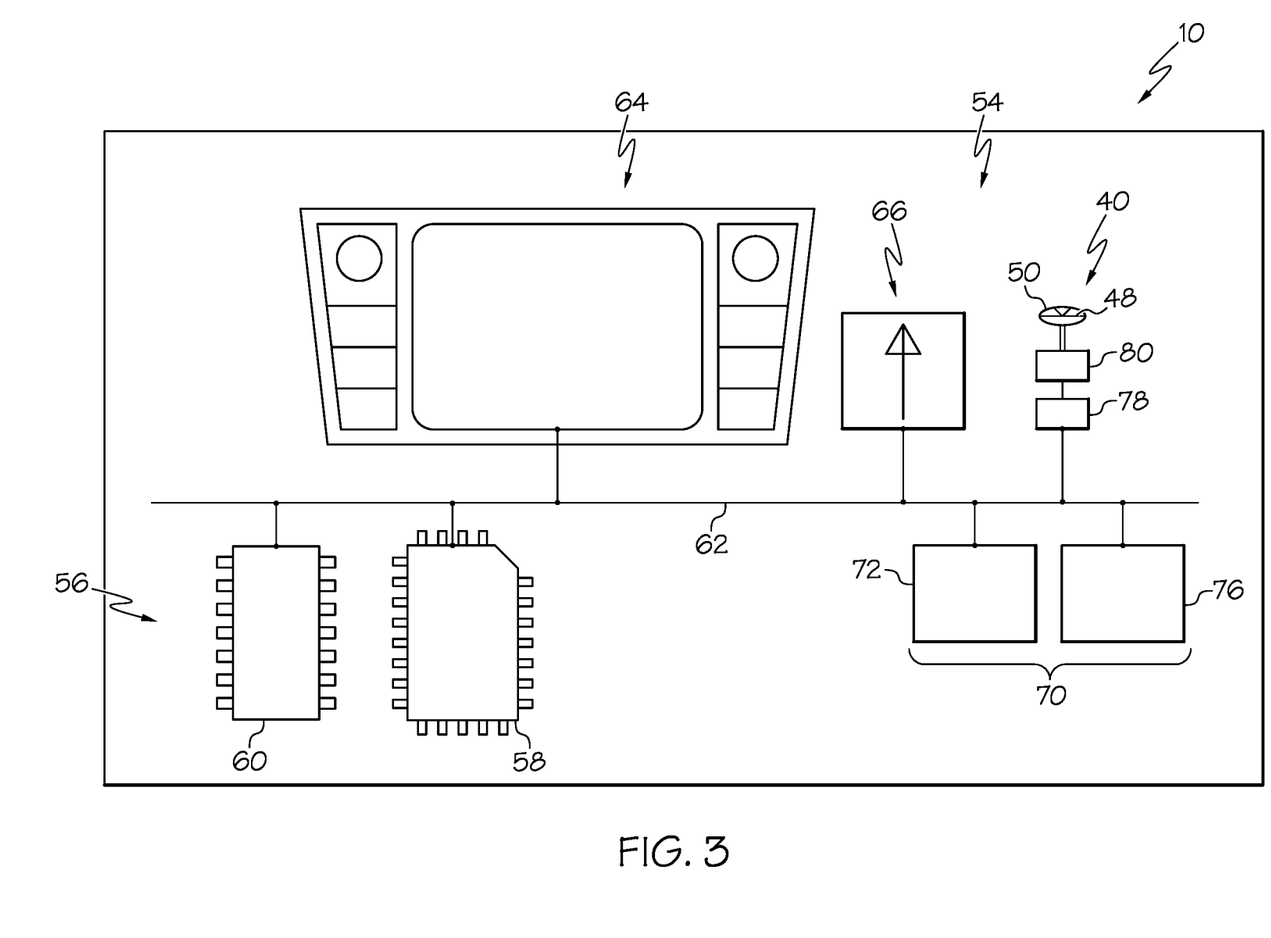
FIG. 3 schematically depicts an object detection system for the vehicle of FIG. 1 according to one or more embodiments shown and described herein.

Referring to FIG. 3, the vehicle 10 includes an object detection system 54 that utilizes one or more computing devices 56. The computing devices 56 can be any type of vehicle-installed (ECU), handheld, desktop, or other form of computing device, or can be composed of multiple computing devices. One or more processors 58 in the computing device 56 can be a single device, or multiple devices, capable of manipulating or processing information. Memory modules 60 in the computing device 56 can be a random access memory device (RAM) or any other suitable type of storage device. The memory modules 60 can include data that is accessed by the one or more processors 58 using a communication path 62. The memory modules 60 can also include an operating system and installed applications, the installed applications including programs that permit the one or more processors 58 to perform various object detection methods.

The one or more processors 58 may be any device capable of executing machine readable instructions. The one or more processors 58 may be coupled to the communication path 62 that provides signal interconnectivity between various modules. Accordingly, the communication path 62 may communicatively couple any number of processors with one another, and allow the modules coupled to the communication path 62 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

The communication path 62 may be formed from any medium that is capable of transmitting a signal such as, for example, conductive wires, conductive traces, optical waveguides, or the like. In some embodiments, the communication path 62 may facilitate the transmission of wireless signals, such as WiFi, Bluetooth, and the like. Moreover, the communication path 62 may be formed from a combination of mediums capable of transmitting signals. In one embodiment, the communication path 62 comprises a combination of conductive traces, conductive wires, connectors, and buses that cooperate to permit the transmission of electrical data signals to components such as processors, memories, sensors, input devices, output devices, and communication devices. Accordingly, the communication path 62 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The object detection system 54 further includes one or more memory modules 60 coupled to the communication path 62. The one or more memory modules 60 may comprise RAM, ROM, flash memories, hard drives, or any device capable of storing machine readable instructions such that the machine readable instructions can be accessed by the one or more processors 58. The machine readable instructions may comprise logic or algorithm(s) written in any programming language of any generation (e.g., 1GL, 2GL, 3GL, 4GL, or 5GL) such as, for example, machine language that may be directly executed by the one or more processors 58, or assembly language, object-oriented programming (OOP), scripting languages, microcode, etc., that may be compiled or assembled into machine readable instructions and stored on the one or more memory modules 60. The machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any suitable computer programming language, as pre-programmed hardware elements, or as a combination of hardware and software components.

In some embodiments, the one or more memory modules 60 may include a database that includes navigation information and/or map information. However, it should be understood that other embodiments may not include navigation information and/or map information. In such embodiments, the object detection system 54 may display on a display 64 road parameters. As an example, and not a limitation, road parameters may include lane lines, on/off ramps, barriers and other structures. Furthermore, the one or more memory modules 60 may include an image recognition database and algorithm to allow the object detection system 54 to identify a target object type sensed within a vicinity of the vehicle 10.

The vehicle 10 comprises the display 64 for providing visual output such as, for example, maps, navigation, entertainment, information, or a combination thereof. The display 64 may coupled to the communication path 62, as shown in FIG. 3. Accordingly, the communication path 62 can communicatively couple the display 64 to other modules of the vehicle 10. The display 64 may include any medium capable of transmitting an optical output such as, for example, a cathode ray tube, light emitting diodes, a liquid crystal display, a plasma display, or the like. Moreover, the display 64 may be a touch screen that, in addition to providing optical information, detects the presence and location of a tactile input upon a surface of or adjacent to the display 64. Accordingly, the display 64 may receive mechanical input directly upon the optical output provided by the display 64. Additionally, it is noted that the display 64 can include at least one of the one or more processors 58 and the one or memory modules 60. As noted above, the display 64 could be at least one of a heads-up display, an instrument cluster display, and a mobile device display. In some embodiments, the vehicle 10 may have a plurality of displays. In such embodiments, the vehicle 10 could also have a plurality of different types of displays. For example, and not as a limitation, the vehicle 10 could have an in-dashboard display and a heads-up display for displaying information directly on a windshield or other window of the vehicle 10.

In some embodiments, the vehicle 10 comprises network interface hardware 66 for communicatively coupling the vehicle 10 to a target object (e.g., another vehicle) such that data can be sent between the vehicle 10 and target object. For instance, the vehicle 10 and target object may send and receive information relevant to speed, road conditions, oncoming obstacles, etc. In some embodiments, when the target object is a vehicle, this may be referred to as vehicle-to-vehicle communication. The network interface hardware 66 can be communicatively coupled to the communication path 62 and can be any device capable of transmitting and/or receiving data via a network. Accordingly, the network interface hardware 66 can include a communication transceiver for sending and/or receiving any wired or wireless communication. For example, the network interface hardware may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 66 includes hardware configured to operate in accordance with the Bluetooth wireless communication protocol. In another embodiment, network interface hardware 66 may include a Bluetooth send/receive module for sending and receiving Bluetooth communications to/from a mobile device. Some embodiments may not include the network interface hardware 66.

The object detection system 54 may include one or more sensors 70 communicatively coupled to the one or more processors 58. The one or more sensors 70 may be used in conjunction with vehicle-to-vehicle communication or alone. The one or more sensors 70 can include, but are not limited to, cameras, LiDAR, RADAR, and proximity sensors. In some embodiments, multiple types of sensors 70 can be used to provide a variety of information to the object detection system 54.

For instance, FIG. 3 illustrates the vehicle 10 utilizing a variety of sensors 70. A camera 72 may be coupled to the communication path 62 such that the communication path 62 communicatively couples the camera 72 to other modules of the vehicle 10. The camera 72 may be any device having an array of sensing devices capable of detecting radiation in an ultraviolet wavelength band, a visible light wavelength band, or an infrared wavelength band. The camera 72 may have any resolution. Suitable cameras may include, for example, a video camera, charge coupled device (CCD) camera, complementary metal-oxide-semiconductor (CMOS) camera, etc. Some embodiments may not include the camera 72. Some embodiments may include multiple cameras. In operation, the camera 72 may be able to detect a target object within a vicinity of the vehicle 10. Further, the camera 72 may be able to determine one or more characteristics about the target object such as, for example, the speed and direction of travel of the target object. In further embodiments, the camera 72 and/or the one or more processors 58, based on input from the camera 72, may be able to also determine the type of object the camera 72 is capturing through image recognition capabilities. For example, the camera 72 and/or the one or more processors 58 may be able to determine whether the target object is another vehicle, a cyclist, a pedestrian, an animal, and/or a structure.

Still referring to FIG. 3, the vehicle 10 may further include other sensors represented by a second sensor 76 in addition to the camera 72. The second sensor 76 is coupled to the communication path 62 such that the communication path 62 communicatively couples the second sensor 76 to other modules of the vehicle 10. The second sensor 76 may be any device capable of outputting a signal indicative of the speed, direction of travel, and the general proximity of the target object to the vehicle 10. In some embodiments, the second sensor 122 may include RADAR, LiDAR, or the like. As described above, any sensor or combinations of sensors may be used to detect and monitor a target object.

The object detection system 54 may be used by the vehicle 10 to control operation of the steering wheel apparatus 40. For example, a motor 78 may be communicatively coupled to the communication path 62 so that the one or more processors 58 can control the rotational position of the steering wheel apparatus 40 to control vehicle direction. For a semi-autonomous vehicle 10, this autonomous control of the steering wheel apparatus 40 may only occur under a predetermined autonomous driving condition. The one or more processors 58 may continuously verify a normal operating condition is present, which allows the vehicle occupant to control operation of the steering wheel apparatus 40. If a normal operating condition is not present (e.g., in impact condition is detected), the one or more processors 58 may intervene and control operation of the steering wheel apparatus 40, for example, using the motor 78 or other suitable actuator.

Automatic operation of the steering wheel apparatus 40 may depend on the detected autonomous driving condition. For example, the detected autonomous condition may be determined by the one or more processors 58 based on input from the sensors 70 and one or more of (i) detected direction of the target object, (ii) detected distance to the target object and (iii) relative/closing speed of the target object. Target classification may also be used where an autonomous driving condition is provided depending, at least in part, on target object type, such as heavy truck, pedestrian, out-of-lane, etc. When an autonomous driving condition is identified, the one or more processors 58 may utilize logic stored in the memory modules 60 that determines how the steering wheel apparatus 40 will operate to change the driving direction of the vehicle 10.

Figure 4:
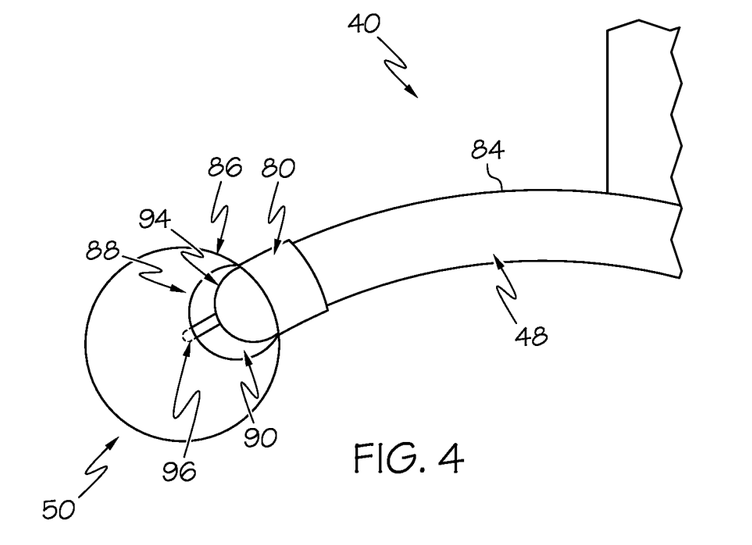
FIG. 4 schematically illustrates a section view of a steering wheel apparatus for the vehicle of FIG. 1 according to one or more embodiments shown and described herein.

In some embodiments, as part of the autonomous driving condition identified, the steering wheel rim 50 may be decoupled from the steering wheel hub 48 using a clutch mechanism 80 that can selectively couple and decouple the steering wheel rim 50 from the steering wheel hub 48. Referring to FIG. 4, the steering wheel apparatus 40 includes the steering wheel hub 48 that is releasably coupled to the steering wheel rim 50. In the illustrated example, the steering wheel rim 50 extends about a periphery of the steering wheel hub 48. The steering wheel rim 50 may extend about the entire periphery of the steering wheel hub 48 forming a closed loop or only partially about the periphery of the steering wheel hub 48.

The steering wheel hub 48 includes spokes 84 that connect to the steering wheel rim 50. A track assembly 86 is provided between the steering wheel hub 48 and the steering wheel rim 50. The track assembly 86 generally includes a track member 88 and a follower member 90. In the illustrated example, the track member 88 is provided by the steering wheel rim 50, while the follower member 90 is provided by the steering wheel hub 48. In other embodiments, the steering wheel rim 50 may provide the follower member and the steering wheel hub 48 may provide the track member. The track assembly 86 allows the steering wheel hub 48 to rotate relative to the steering wheel rim 50. In some embodiments, the track assembly 86 also allows the steering wheel rim 50 to rotate relative to the steering wheel hub 48.

The clutch mechanism 80 is provided between the steering wheel hub 48 and the steering wheel rim 50. As used herein, the term "clutch mechanism" refers to a device that selectively couples and decouples the steering wheel rim 50 and the steering wheel hub 48 to allow relative movement therebetween. As described above, the clutch mechanism 80 may be communicatively coupled to the communication path 62 and may be operated by the one or more processors 58 in response to the identified autonomous driving condition. For example, the one or more processors 58 may determine that the steering wheel apparatus 40 is to be turned at a predetermined angular velocity and/or for a predetermined angular distance in response to the autonomous driving condition. If the predetermined angular velocity and/or predetermined angular distance are above a predetermined threshold, the one or more processors 58 may decouple the steering wheel rim 50 from the steering wheel hub 48 to allow the steering wheel hub 48 to rotate relative to the steering wheel rim 50, e.g., while the driver maintains a grip on the steering wheel rim 50. In some embodiments, the one or more processors 58 may decouple the steering wheel rim 50 from the steering wheel hub 48 upon determination of any autonomous driving condition. In other words, any time the steering wheel apparatus 40 is autonomously controlled, the one or more processors 58 may decouple the steering wheel rim 50 and the steering wheel hub 48. Once the autonomous driving condition no longer exists, the one or more processors 58 may again couple the steering wheel rim 50 and the steering wheel hub 48 to allow for manual driving.

Any suitable clutch mechanism 80 may be used to selectively couple and decouple the steering wheel rim 50 from the steering wheel hub 48. For example, the clutch mechanism 80 may include an electromagnetic actuator, such as a linear solenoid 94 that engages and disengages corresponding connecting structure 96 provided by the track assembly 86. Mechanical systems such as braking mechanisms and/or electromagnetic systems may be used.

Figure 5:
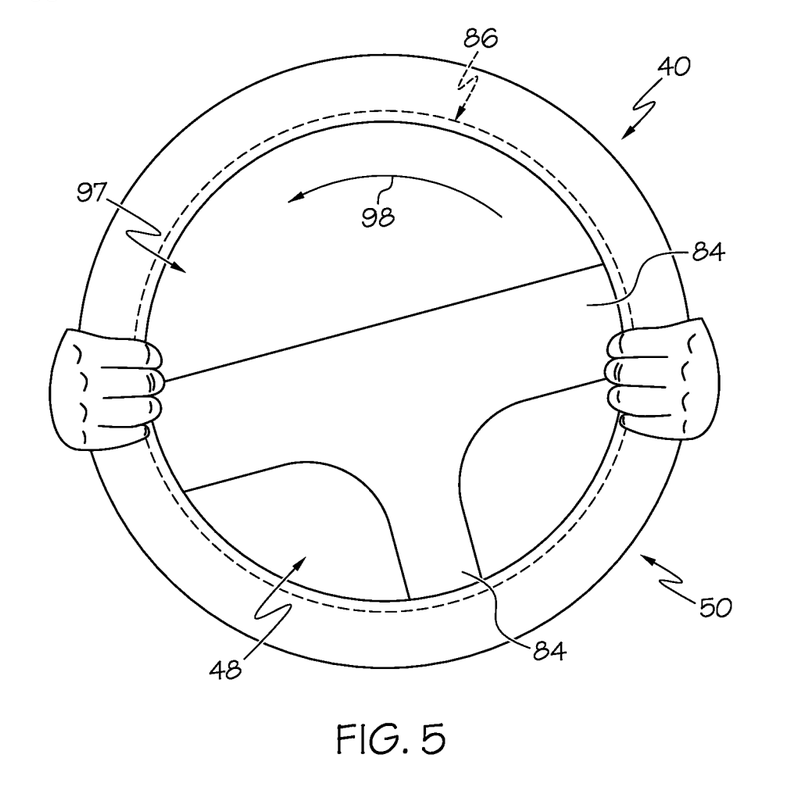
FIG. 5 schematically illustrates operation of the steering wheel apparatus of FIG. 4 according to one or more embodiments shown and described herein.

Referring to FIG. 5, operation of the steering wheel apparatus 40 is illustrated in the presence of an autonomous driving condition. In this example, the steering wheel rim 50 is decoupled from the steering wheel hub 48, which allows the steering wheel hub 48 to rotate relative to the steering wheel rim 50 within an opening 97 of the steering wheel rim 50. The steering wheel rim 50 can remain connected to the steering wheel hub 48 as the steering wheel hub 48 rotates. The track assembly 86 may inhibit removal of the steering wheel rim 50 from the steering wheel hub 48 so that the clutch mechanism 80 can couple the steering wheel rim 50 the steering wheel hub 48 after the autonomous driving condition is no longer present. In some embodiments, the clutch mechanism 80 can couple the steering wheel rim 50 and the steering wheel hub 48 with the steering wheel hub 48 at any angular position relative to the steering wheel rim 50. Such a continuously variable coupling arrangement can allow the steering wheel rim 50 to couple with the steering wheel hub 48 without any need for the steering wheel hub 48 to return to a predefined angular position before coupling occurs. In other embodiments, the steering wheel hub 48 may return to a predefined angular position before coupling occurs.

Figure 6:
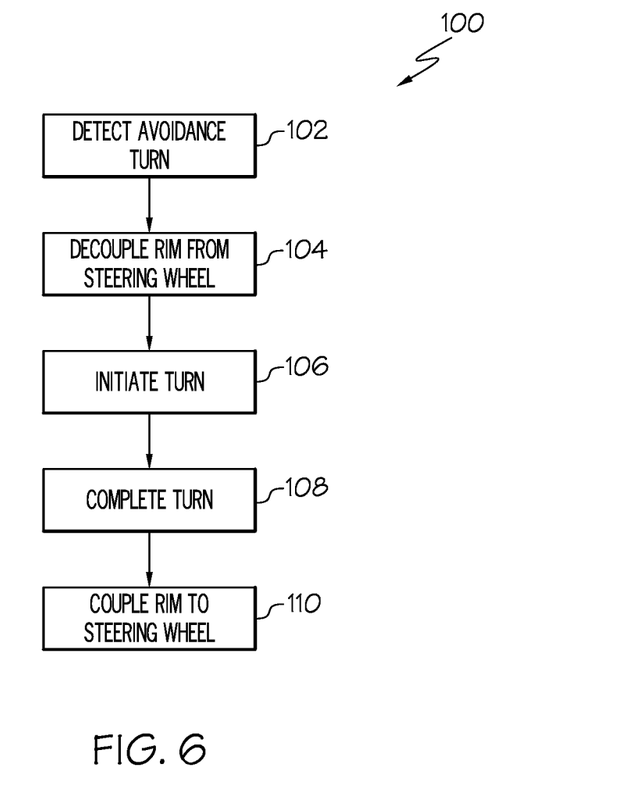
FIG. 6 illustrates a method of decoupling a steering wheel rim and steering wheel hub of the steering wheel according to one or more embodiments shown and described herein.

Referring to FIG. 6, a method 100 of decoupling the steering wheel rim from the steering wheel hub during an autonomous driving condition is shown. At step 102, the object detection system is used by the vehicle to detect a target object and determine an autonomous driving condition is present where the steering wheel apparatus is to be turned. In response to the detected autonomous driving condition, the clutch mechanism decouples the steering wheel rim from the steering wheel hub at step 104. At step 106, a turn is initiated autonomously where the steering wheel hub rotates relative to the steering wheel rim. Angular position of the steering wheel hub and the spokes provide a visual indication of driving direction of the vehicle to the driver. Upon completion of the autonomous driving condition, the clutch mechanism is used to couple the steering wheel rim and the steering wheel hub to allow manual driving until another autonomous driving condition is detected.

The above-described vehicle steering assemblies provide a steering wheel apparatus where the steering wheel rim can be selectively decoupled from the steering wheel hub. This can allow the steering wheel hub to rotate relative to the steering wheel rim upon detection of an autonomous driving condition. An object detection system may be used to detect a target object and determine whether an autonomous driving condition is present. In response to the presence of an autonomous driving condition, a clutch mechanism may be used to decouple the steering wheel rim from the steering wheel hub. Once the autonomous driving condition is no longer present, the clutch mechanism may couple the steering wheel rim to the steering wheel hub to resume manual driving.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
    a steering column assembly comprising a steering column;
    a steering wheel apparatus connected to the steering column, the steering wheel apparatus comprising:
        a steering wheel hub that is connected to the steering column;
        a steering wheel rim that is connected to the steering wheel hub; and
        a clutch mechanism that selectively decouples the steering wheel rim from the steering wheel hub thereby allowing rotation of the steering wheel hub relative to the steering wheel rim within an opening of the steering wheel rim.

2. The vehicle of claim 1 further comprising an object detection system including logic that detects presence of a target object within a sensing range of a sensor and determines if an autonomous driving condition is present due to presence of the target object.

3. The vehicle of claim 2 further comprising a controller that controls operation of the clutch mechanism during presence of the autonomous driving condition.

4. The vehicle of claim 3 further comprising an actuator that rotates the steering wheel hub relative to the steering wheel rim during presence of the autonomous driving condition.

5. The vehicle of claim 4, wherein angular position of the steering wheel hub provides a visual indication to an occupant of driving direction of the vehicle during presence of the autonomous driving condition.

6. The vehicle of claim 3, wherein the controller couples the steering wheel rim and the steering wheel hub using the clutch mechanism upon completion of the autonomous driving condition.

7. The vehicle of claim 6, wherein the clutch mechanism couples the steering wheel rim to the steering wheel hub with the steering wheel hub at any angular position relative to the steering wheel rim.

8. The vehicle of claim 1, wherein the steering wheel apparatus includes a track assembly located between the steering wheel rim and the steering wheel hub, the track assembly allowing rotation of the steering wheel hub relative to the steering wheel rim.

9. A steering wheel apparatus for a vehicle, the steering wheel apparatus comprising:
    a steering wheel hub;
    a steering wheel rim connected to the steering wheel hub; and
    a clutch mechanism that selectively decouples the steering wheel rim from the steering wheel hub thereby allowing rotation of the steering wheel hub relative to the steering wheel rim within an opening of the steering wheel rim.

10. The steering wheel apparatus of claim 9, wherein the clutch mechanism couples the steering wheel rim to the steering wheel hub with the steering wheel hub at any angular position relative to the steering wheel rim.

11. The steering wheel apparatus of claim 9, wherein the steering wheel apparatus includes a track assembly located between the steering wheel rim and the steering wheel hub, the track assembly allowing rotation of the steering wheel hub relative to the steering wheel rim.

12. The steering wheel apparatus of claim 11, wherein the track assembly inhibits removal of the steering wheel rim from the steering wheel hub while the steering wheel hub rotates relative to the steering wheel rim.

13. The steering wheel apparatus of claim 9, wherein the clutch mechanism comprises an electromagnetic actuator.

14. A method of decoupling a steering wheel rim from a steering wheel hub during an autonomous driving condition, the method comprising:
    detecting a target object using one or more sensors that provide input to one or more processors;
    determining a location of the target object relative to the vehicle using the input and the one or more processors; and
    the one or more processors determining if an autonomous driving condition is present based on the input, the one or more processors controlling a clutch mechanism of a steering wheel apparatus decoupling a steering wheel rim from a steering wheel hub thereby allowing rotation of the steering wheel hub relative to the steering wheel rim within an opening of the steering wheel rim if the autonomous driving condition is present.

15. The method of claim 14 further comprising rotating the steering wheel hub relative to the steering wheel rim using an actuator if the autonomous driving condition is present, the one or more processors controlling the actuator.

16. The method of claim 15 comprising providing a visual indication of driving direction to an occupant using an angular position of the steering wheel hub during presence of the autonomous driving condition.

17. The method of claim 14, wherein the one or more processors coupling the steering wheel rim to the steering wheel hub upon completion of the autonomous driving condition.

18. The method of claim 17, wherein the clutch mechanism couples the steering wheel rim to the steering wheel hub with the steering wheel hub at any angular position relative to the steering wheel rim.

19. The method of claim 14, wherein the steering wheel apparatus includes a track assembly located between the steering wheel rim and the steering wheel hub, the track assembly allowing rotation of the steering wheel hub relative to the steering wheel rim during the autonomous driving condition.

20. The method of claim 19, wherein the track assembly inhibiting removal of the steering wheel rim from the steering wheel hub while the steering wheel hub rotates relative to the steering wheel rim.

\* \* \* \* \*